Patented Oct. 12, 1948

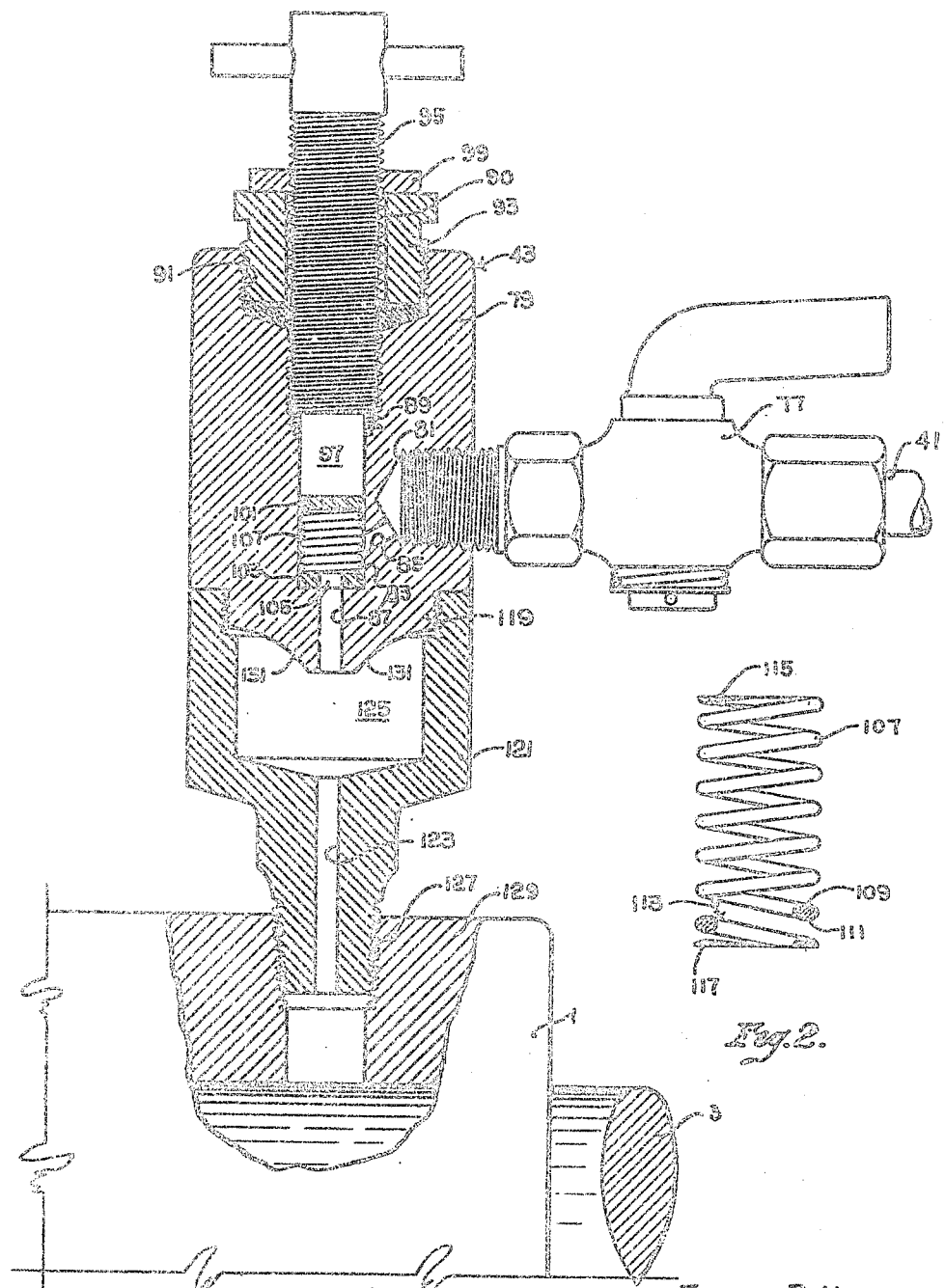

2,451,387

UNITED STATES PATENT OFFICE 2,451,387

LUBRICATOR

Frank B. Harvuot, Fort Wayne, Ind., assignor to Bowser, Inc., Fort Wayne, Ind., a corporation of Indiana Original application July 27, 1942, Serial No. 452,513. Divided and this application February 18, 1944, Serial No. 522,936

7 Claims. (Cl. 138—46)

This invention relates to a lubricator; more specifically, it relates to a lubricator which accurately controls small flows of lubricant to bearings.

An object of the invention is to provide a lubricator which will dispense lubricant at a very slow but controlled rate of flow.

A further object of the invention is to provide a lubricator which is readily regulated to dispense various small amounts of oil.

Another object of the invention is to provide a lubricator in which the flow regulating element or valve is a spring.

Yet a further object of the invention is to provide a lubricator of the kind described in which the spring may be compressed more or less to regulate the rate of feed of the lubricant.

Still another object of the invention is to provide a lubricator in which the discharge is visible and which is adjustable to vary the discharge.

It is another object of the invention to provide a control valve which comprises a coiled spring which is compressed to various degrees to vary the open areas between the adjacent coils.

Another object of the invention is to provide a control valve which comprises a helical spring having a flattened cross section.

These and other objects will become apparent from a study of this specification and the drawings which are attached hereto and made a part hereof and in which:

Figure 1 is a sectional view of the lubricator connected to a bearing.

Figure 2 is a view partially in section showing the spring type valve.

This application is a division of application Serial Number 452,513, filed July 27, 1942, now Patent No. 2,435,832.

The lubricator, generally designated by the numeral 43, has its outlet 123 connected to a bearing 1 for a shaft 3 or other device to be lubricated and is also connected to a tank or some other suitable source of lubricant under pressure by a line 41. A plug cock 77 is disposed in the line 41 adjacent the lubricator 43. The latter comprises a body 79 which is provided with a tapped inlet 81 and a spring or valve chamber 83 which is connected to the inlet by a bore 85. A discharge opening 87 extends downwardly from chamber 83 while an enlarged and threaded bore 89 extends upwardly from the chamber and merges with an even larger, threaded bore 91.

A packing nut 93 is received in bore 91 and is provided with a smooth internal bore 99 to receive the adjusting screw 95 which carries a reduced, cylindrical extension 97 at its lower end. A jam nut 99 is received on the adjusting screw and is adapted to be drawn up against the packing nut to hold the screw adjustment.

The lower face of the extension 97 rests upon a plug 101 of "neoprene" or other suitable yieldable material while a perforated washer 103 of the same material is disposed on the bottom of chamber 89, the hole 105 in the washer being in alignment with the discharge opening 87. The control valve or spring 107 is confined between these two washers and the ends of the spring are sealed against passage of liquid around them.

As shown in Figure 2, the spring or valve comprises a helical coil of spring wire which is flattened in cross section to provide flat upper and lower faces 109, 111 on each coil. There is accordingly provided by this valve a helical metering orifice 113 which has substantially parallel upper and lower walls. By compressing the spring, the orifice is reduced in area and vice versa.

The ends 115 and 117 of the spring are faced off so as to be perpendicular to the longitudinal axis of the spring to afford good seats on the plug and washer 101, 103.

A threaded projection 119 is formed on the lower end of the body 79 and an internally threaded discharge member 121 is screwed thereon. This member is made of transparent material such as the plastic known as "Lucite" so that the drops of oil passing between the discharge tube 87 and the discharge bore 123 leading to the bearing will be visible to an observer. The member 121 is formed with a chamber 125 between ducts 87 and 123 in which oil will collect in the event duct 123 or one connecting therewith becomes plugged or if the rate of flow through valve 107 is too great.

The lower end 127 of the member is threaded externally so as to enter a threaded hole in the bearing 129.

As shown in Figure 1, the lower end 131 of the body 43 is tapered downwardly from the periphery of 119 toward the outlet of discharge duct 87 to prevent the oil from spreading in a film over this surface.

Operation

When the line 41 has been connected to a suitable source of oil under pressure, the cock 77 is opened to permit the flow of oil to the lubricator. Thereafter, the lubricator is adjusted by turning the adjusting screw 95 to compress or relieve spring valve 107 until the required number of drops per minute are seen through the transparent member 121.

The valve 107 is usually of steel wire having eight coils and is of .030 x .055 cross section with 1/8" minimum inside diameter and about 1/4" outside diameter. It is about 1/2" long when free and 1/4" long when closed. With a spring valve constructed on these dimensions, a minimum flow of 1½ drops a minute can be attained using a 140 S. S. U. oil at 100 degrees Fahrenheit and with a pressure of 5 p. s. i. on the oiler.

This type of valve has the advantage of maintaining a constant flow for long periods of time whereas the usual needle valve is comparatively erratic.

The oil enters the cock 77 and passes through duct 85 into the spring valve chamber and around the exterior of the spring valve. The setting of the spring valve determines the rate of flow of the oil through the helical orifice 113. The oil which passes through the orifice will move downwardly through hole 105 in washer 103, through duct 87 to the end thereof where it forms into a drop and falls through the chamber 125 and flows into the duct 123 and thence to the bearing 129.

The washer or plug 101 seals the upper end of the chamber but should any oil escape it would be blocked off by the packing 91. The washer 103 seals the lower end of the chamber outside of the spring so that no lubricant will by-pass the orifice 113.

Once a setting is obtained, the jam nut 99 is tightened against the packing nut 93 to hold the adjusting screw.

The pressure at the lubricator should be about 5 p. s. i. for efficient operation. The viscosity of the oil also effects the rate of flow through the spring valve so that a lower rate of flow can be attained with a heavy oil than with a light oil.

It is obvious that various changes may be made in the form, structure and arrangement of parts without departing from the spirit of the invention. Accordingly, applicant does not desire to be limited to the specific embodiment disclosed herein primarily for purposes of illustration; but instead, he desires protection falling fairly within the scope of the appended claims.

What I claim to be new and desire to protect by Letters Patent of the United States is:

1. In a lubricant feeding device, an inlet duct, an outlet duct, a chamber connecting said ducts, a helical rate of flow control element in said chamber, disposed to separate said ducts, said element being so positioned in said chamber as to cause lubricant to pass through the element in substantially a radial direction.

2. In a feeding device, an inlet duct, an outlet duct, a chamber connecting said ducts, a helical rate of flow control element in said chamber, said element being compressible to vary the rate of flow through it and disposed to separate said ducts.

3. In a feeding device, an inlet duct, an outlet duct, a chamber connecting said ducts, a compressible, substantially helical rate of flow control element in said chamber, disposed to separate said ducts, and means for adjustably compressing said element to change the area of the open space in said element to vary the rate of flow through it.

4. In a feeding device, an inlet duct, an outlet duct, a chamber connecting said ducts, and a helical rate of flow control element in said chamber, said element being in a general form of a cylinder having a flattened cross section would so as to form an orifice having substantially parallel upper and lower limiting surfaces, said element being disposed to separate said ducts.

5. In a feeding device, a valve chamber, a helical rate of flow control element having inner and outer sides, disposed in said chamber and sealed at its ends against said chamber, an inlet duct communicating with one side of said element and an outlet duct communicating with the other side, whereby liquid may pass from the inlet to the outlet duct through the orifice formed by the helix at a rate controlled in part by the size of said orifice.

6. In a feeding device, a valve chamber, a helical rate of flow control element having inner and outer sides, disposed in said chamber and sealed at its ends against said chamber, an inlet duct communicating with one side of said element and an outlet duct communicating with the other side, whereby liquid may pass from the inlet to the outlet duct through the orifice formed by the helix, and means for reducing the effective area of said orifice.

7. In a feeding device, a valve chamber, a helical rate of flow control element having inner and outer sides, disposed in said chamber and sealed at its ends against said chamber, an inlet duct communicating with one side of said element and an outlet duct communicating with the other side, whereby liquid may pass from the inlet to the outlet duct through the orifice formed by the helix, and means for changing the effective area of said orifice, comprising means for compressing or expanding said element axially.

FRANK B. HARVUOT.

REFERENCES CITED

The following references are of record in the file of this patent:

UNITED STATES PATENTS

| Number | Name | Date |
| --- | --- | --- |
| 805,079 | Koehler et al. | Nov. 21, 1905 |
| 1,813,122 | Moore | July 7, 1931 |
| 1,905,527 | Thomas et al. | Apr. 25, 1933 |
| 2,302,097 | Beckman | Nov. 17, 1942 |
| 2,308,365 | Davis | Jan. 19, 1943 |

FOREIGN PATENTS

| Number | Country | Date |
| --- | --- | --- |
| 427,880 | Germany | Apr. 21, 1926 |